(No Model.) 4 Sheets—Sheet 1.

J. F. SWINNERTON.
ROLLER BALING PRESS.

No. 586,574. Patented July 20, 1897.

Witnesses
H. C. Alexander.
E. E. Vernell

Inventor
James F. Swinnerton
By Attorneys
Fowler & Fowler (No Model.) 4 Sheets—Sheet 2.

J. F. SWINNERTON.
ROLLER BALING PRESS.

No. 586,574. Patented July 20, 1897.

Witnesses
W. C. Alexander
E. E. Verrell

Inventor
James F. Swinnerton
By Attorneys
Fowler & Fowler

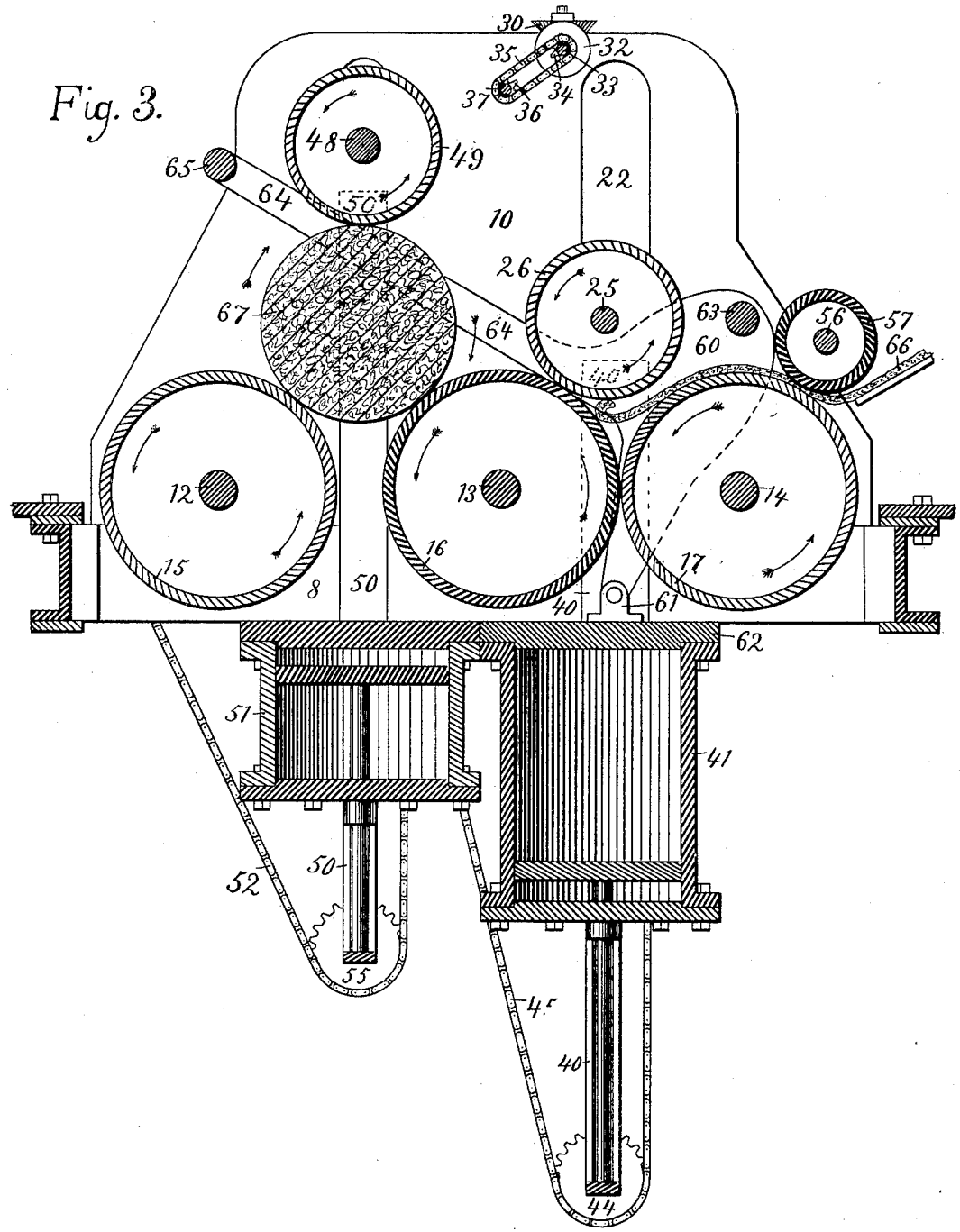

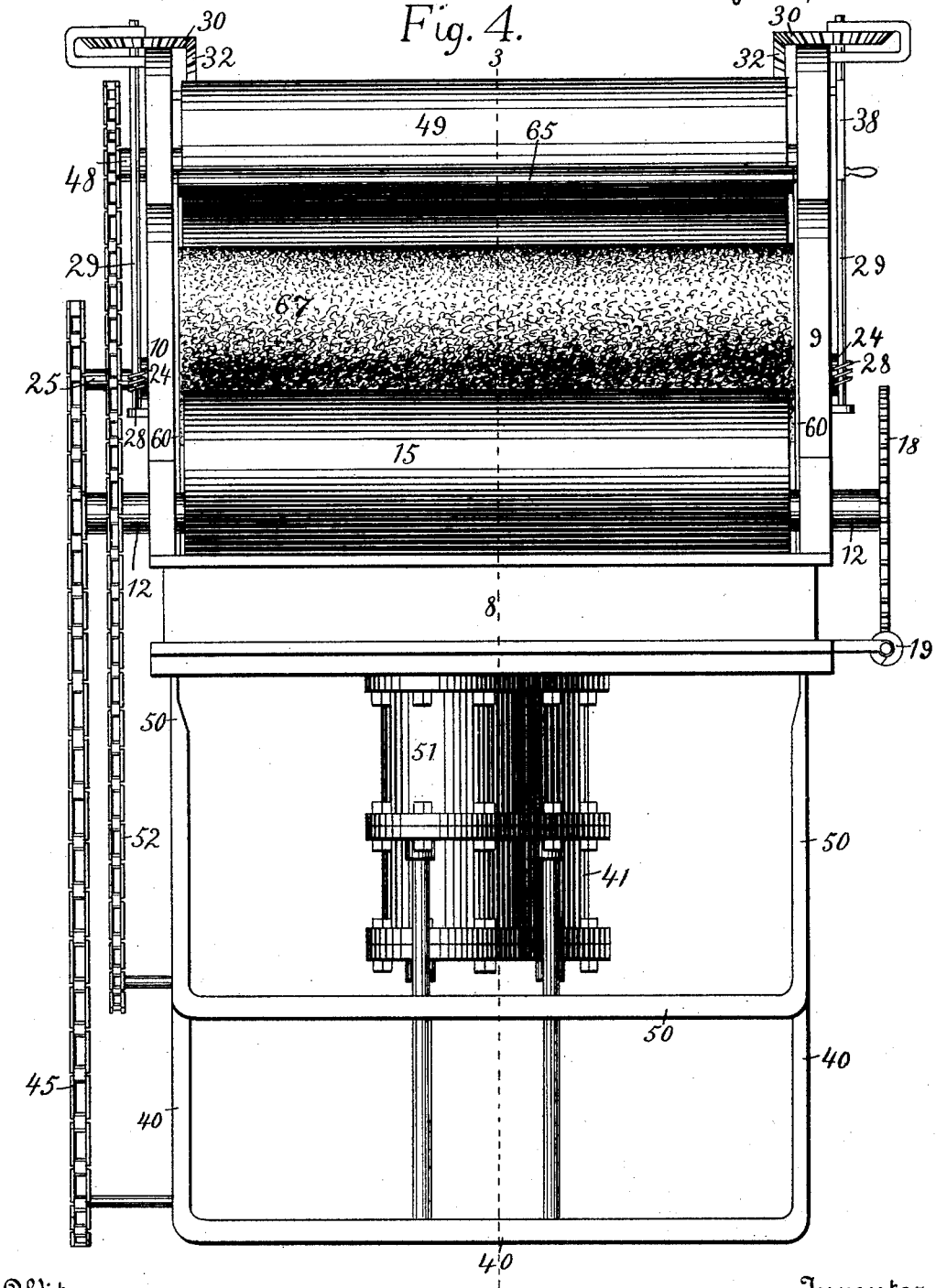

UNITED STATES PATENT OFFICE.

JAMES F. SWINNERTON, OF ST. LOUIS, MISSOURI, ASSIGNOR, BY MESNE ASSIGNMENTS, TO GEORGE KINGSLAND, OF SAME PLACE.

ROLLER BALING-PRESS.

SPECIFICATION forming part of Letters Patent No. 586,574, dated July 20, 1897.

Application filed September 12, 1895. Serial No. 562,274. (No model.)

*To all whom it may concern:*

Be it known that I, JAMES F. SWINNERTON, a citizen of the United States, residing at the city of St. Louis, in the State of Missouri, have invented certain new and useful Improvements in Roller Baling-Presses, of which the following is such a full, clear, and exact description as will enable any one skilled in the art to which it appertains to make and use the same, reference being had to the accompanying drawings, forming part of this specification.

My invention consists in a roller baling-press in which two or more sets of several rollers are employed to roll a coreless bale between each set of several rollers, whereby bale-cores and bale-core holding and supporting devices are dispensed with in a duplex press and the coreless bale formed between one set of rollers may be more easily transferred to the other set of rollers to have the bagging applied, while a new coreless bale is being formed between the first set of rollers, without stopping the press, so that the operation of a coreless press is rendered continuous and the baling thereby greatly facilitated.

The invention consists in other features, which will be pointed out in the claims.

Figure 1:
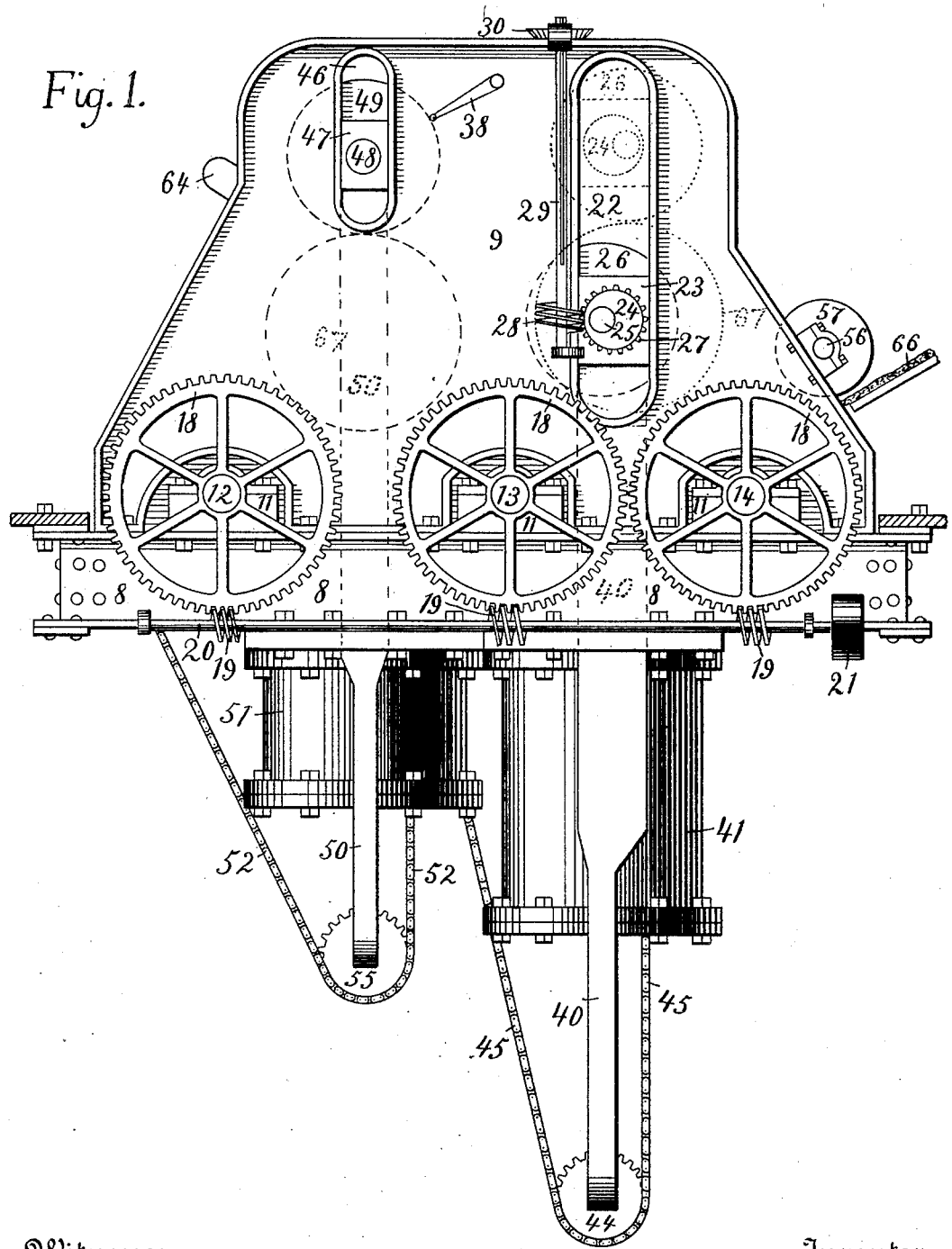
Figure 2:
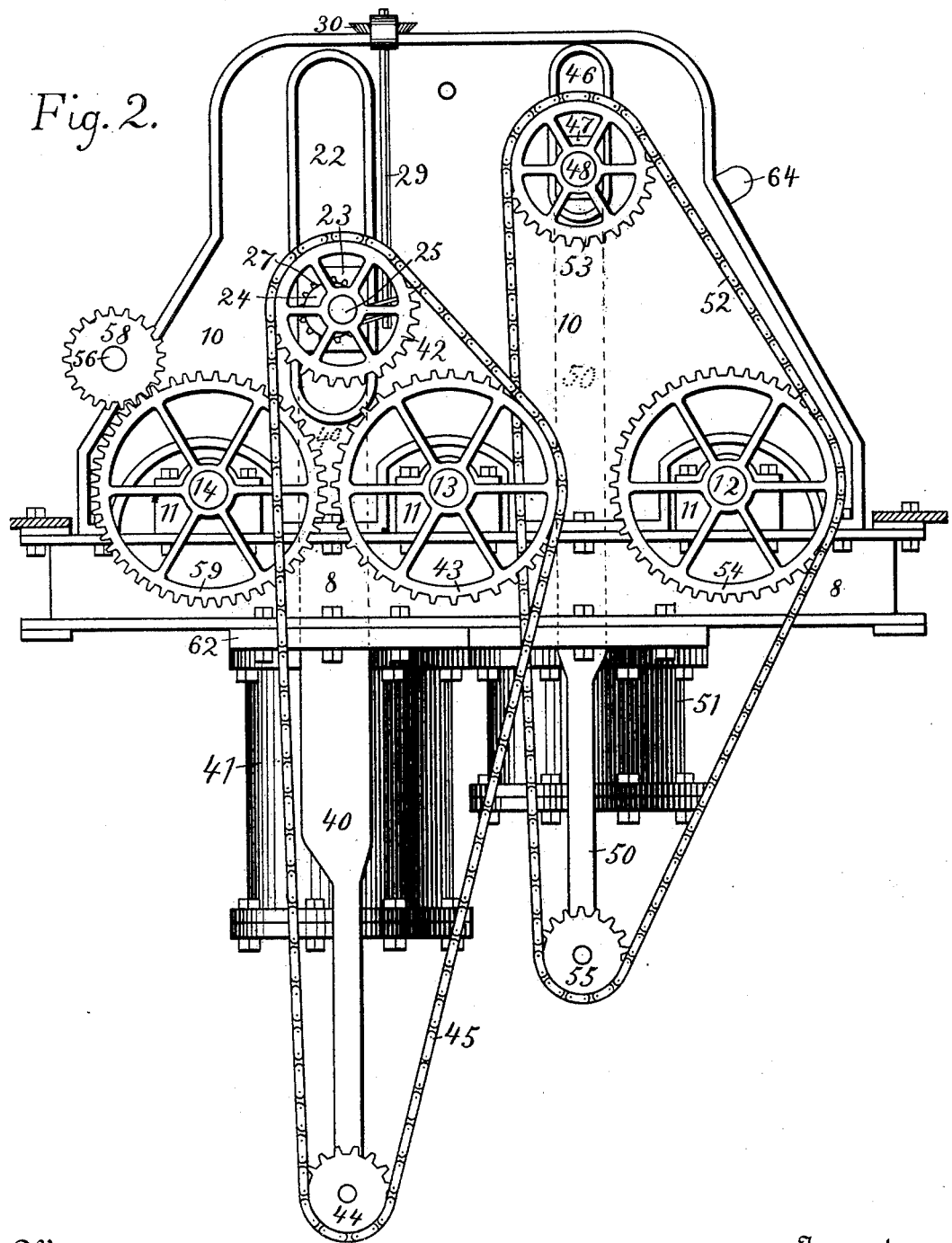

In the accompanying drawings, which illustrate one form of press made in accordance with my invention, Figure 1 is an end view. Fig. 2 is an end view looking at the end opposite from that shown in Fig. 1. Fig. 3 is a section on the line 3 3 of Fig. 4, and Fig. 4 is a side view.

I wish it to be understood that I do not limit my invention to the details of construction set forth, as my invention is susceptible of being embodied in various forms.

Like marks of reference refer to the same parts in the several views of the drawings.

8 is a rectangular frame or base to which are bolted or otherwise suitably secured two similar end frames 9 and 10. Journaled in boxes 11, secured to the base 8, and located in suitable openings in the end frames or plates 9 and 10 are three shafts 12, 13, and 14, on which are rigidly mounted three main rollers 15, 16, and 17, Fig. 3. The shafts 12, 13, and 14 are extended at one end of the press, and to them are rigidly secured three worm-wheels 18, Fig. 1, which are driven by worms 19 on a shaft 20, journaled in boxes suitably secured to the base 8. To the shaft 20 is secured a belt-pulley 21, to which the power is applied.

In the end frames 9 and 10 and above and between the rollers 16 and 17 are guideways 22, in which slide boxes 23. In the boxes 23 are journaled circular boxes 24, in which is eccentrically journaled a shaft 25, on which is carried a presser-roller 26. Each of the circular boxes 24 projects some distance beyond the boxes 23, and is provided with worm-teeth 27, Figs. 1 and 2, which engage with worms 28 on shafts 29, which are carried by the boxes 23. Other means than this worm-gearing may be employed to operate the circular boxes 24. I have shown worm-gearing for the purpose merely to illustrate a form of mechanism for operating said circular boxes.

30 are bevel gear-wheels which are keyed to the shafts 29, so as to allow the said shafts to rise and fall with the sliding boxes 23. These bevel gear-wheels 30 engage with bevel gear-wheels 32 on a shaft 33, Fig. 3, journaled in the end frames 9 and 10. On the shaft 33 is a sprocket-wheel 34, which is connected by means of a sprocket-chain 35 with a sprocket-wheel 36 on a shaft 37, which is journaled in the end frames 9 and 10. This shaft 37 is extended at one end of the press and provided with a crank-arm 38, Figs. 1 and 4, by means of which it is rotated. By rotating the crank-arm 38 the two circular boxes 24 are simultaneously rotated and the roller 26 thus moved laterally to form a throat for the admission of cotton to start a bale, as shown in Fig. 3.

The sliding boxes 23 are carried by a U-shaped connecting-bar 40, which is attached to the piston-rod of a cylinder 41. The arms of the connecting-bar 40 are the same width as the guideways 22 and slide in rabbets or grooves in the plates 9 and 10, so as to leave the inside surface of the said plates smooth and cover up the ways 22 as the roller 26 is raised. The shaft 25 of the roller 26 is extended beyond the end frame 10 and has rigidly mounted on it a sprocket-wheel 42, Fig. 2. A sprocket-wheel 43 is secured on the shaft 13 of the roller 16 at the same end of the press as the sprocket-wheel 42. Around these wheels 42 and 43 and an idle-wheel 44, carried on the connecting-bar 40, passes a sprocket-chain 45, and the roller 26 is thus driven from the shaft 13. In the end frames 9 and 10 and above and between the rollers 15 and 16 are guideways or slots 46, in which slide boxes 47, Figs. 1 and 2, in which is journaled a shaft 48, on which is mounted a roller 49. The boxes 47 are carried by a U-shaped connecting-bar 50, similar to the bar 40. The bar 50 slides in grooves in the end frames 9 and 10 in the same manner as the bar 40 and is attached to the piston-rods of a cylinder 51. The roller 49 is driven from the shaft 12 by a sprocket-chain 52, passing around a sprocket-wheel 53 on the shaft 48 of the roller 49, a sprocket-wheel 54 on the shaft 12 of the roller 15, and an idle-wheel 55, carried on the connecting-bar 50. Journaled in boxes secured to the end frames 9 and 10 and above the roller 17 is a shaft 56, on which is mounted a roller 57, between which and the roller 17 the bat is compressed as it enters the press. On the shaft 56 at the same end of the press as the sprocket-wheels 43 and 54 is rigidly mounted a spur-wheel 58, Fig. 2, which meshes with a spur-wheel 59 on the shaft 14 of the roller 17.

60, Figs. 3 and 4, are plates or arms of metal, preferably steel, which are pivoted to lugs 61, Fig. 3, secured below and between the rollers 16 and 17 to a plate 62, which carries the cylinder 41. Carried by the plates 60 and in front of the roller 57 is a rod 63. The plates 60 are provided with extensions 64, which project at the side of the press and are connected by a handle-bar 65. By drawing the handle-bar 65 down the bale is forced by the rod 63 from the first to the second set of rollers. The plates 60 are made thin and have their edges beveled, so as not to interfere with the forming of the bale. 66 represents the bat of cotton and 67 the completed bale.

The operation of my press is as follows: The crank-handle 38, Figs. 1 and 4, is turned until the roller 26 is in the position shown in Fig. 3, leaving a throat or space between the rollers 26 and 17 for the admission of the bat of cotton. The bat 66 enters the press between the rollers 16, 17, and 26 through the throat. Here the bat is folded or wound upon itself to start the bale by the rotation of the rollers. After the bale has reached some size the crank-handle 38 is rotated to move the roller 26 directly over the bale. As soon as the bale has reached the desired size the rollers 26 and 49 are both raised to their highest positions by the steam-cylinders 41 and 51 and connections and the handle-bar 65 drawn down. This causes the bar 63 to force the bale over the roller 16 into a position between the rollers 15, 16, and 49. The handle-bar 65 is now raised and the bar 63 thus thrown back out of the way of the roller 26. The bat of cotton follows the bale when transferred over the roller 16 and continues to be wound on the bale until the roller 26 is moved laterally into position for starting a new bale and is lowered against the bat. As soon as the roller 26 is lowered against the bat it severs the bat and begins forming a new bale. The bagging is now applied to the completed bale between the rollers 15, 16, and 49 in the usual manner. After the new or second bale is formed the first-formed bale is forced out of the press by the transference of the newly-formed bale to the second set of rollers.

Having fully described my invention, what I claim as new, and desire to secure by Letters Patent of the United States, is—

1. In a baling-press, a set of several compression-rollers between which a coreless bale is rolled, in combination with a second set of several compression-rollers to which said coreless bale is transferred for the purpose of applying the bagging to said bale, and means for rotating said rollers.

2. In a baling-press, a set of several compression-rollers between which a coreless bale is rolled, a second set of several compression-rollers to which said coreless bale is transferred, means for transferring said coreless bale from the first-mentioned set of compression-rollers to the second set for the purpose of applying the bagging to said bale, and means for rotating said rollers.

3. In a baling-press, three rigidly-journaled compression-rollers, a movably-journaled compression-roller arranged above the spaces between each of said rollers, said rigidly and movably journaled rollers adapted to roll coreless bales between them, means for transferring the coreless bale rolled between one set of rollers to the other set for the purpose of applying the bagging to said bale, and means for rotating said rollers.

4. In a baling-press, three rigidly-journaled compression-rollers, movably-journaled compression-rollers arranged above the spaces between said rollers, a fluid-pressure cylinder controlling each movably-journaled roller, flexible gearing passing over suitable wheels on the shafts of said rollers and over a wheel on the fluid-pressure-cylinder connections, means for transferring the bale from one set of rollers to the other for the purpose of applying the bagging to the bale, and means for rotating said rollers.

5. In a baling-press, a series of rigidly-journaled compression-rollers, a series of movably-journaled compression-rollers arranged above the spaces between said rollers, end frames for said rollers, arms pivoted at each side of said end frames, and a bar projecting from said arms in the path of the bale for the purpose of transferring the bale.

6. In a baling-press, a series of rigidly-journaled lower compression-rollers, movably-journaled upper compression-rollers arranged above the spaces between said rigidly-journaled rollers, end frames, means for rotating said rollers, boxes for said movably-journaled rollers sliding in slots in said end frames, fluid-pressure cylinders for said movably-journaled rollers, bars connecting said movably-journaled rollers to the piston-rods of said fluid-pressure cylinders, said bars operating to close the slots in said end frames as the movable rollers rise, and means for transferring the bale from one set of rollers to another for the purpose of applying the bagging to said bale.

In witness whereof I have hereunto set my hand and affixed my seal in the presence of the two subscribing witnesses.

JAMES F. SWINNERTON. [L. S.]

Witnesses:
 JAMES G. WRIGHT,
 J. B. SCALE.